United States Patent Office 2,833,785
Patented May 6, 1958

2,833,785

PROCESS FOR THE PRODUCTION OF GLYCOL SULFITE

Wilhelm Dietrich, Marl, Westphalia, and Horst Höfermann, Recklinghausen, Germany, assignors to Chemische Werke Hüls Aktiengesellschaft, Marl, Germany, a corporation of Germany No Drawing. Application July 25, 1955
Serial No. 524,289

Claims priority, application Germany October 21, 1954

1 Claim. (Cl. 260—327)

It has been proposed to produce glycol sulfite by passing ethylene oxide and sulfur dioxide in gaseous state over catalysts at elevated temperatures. According to this process, however, the reactants undergo only partial conversion.

It has now been found that glycol sulfite can be produced by causing ethylene oxide and sulfur dioxide to react with each other in the liquid phase at temperatures of 50–170° C. and at superatmospheric pressures in the absence of catalysts. It is advantageous to use the ethylene oxide and sulfur dioxide in equimolar quantities. The reaction begins at a temperature below 50° C. In general however, it is advantageous to carry out the reaction at temperatures of at least 100° C. and preferably 130–170° C. In order to maintain the mixture of ethylene oxide and sulfur dioxide in the liquid phase at these temperatures, pressure must be employed. The required pressure varies with the selected reaction temperature. For example, at 50° C. it must be at least 4 atm., at 100° C., at least 12 atm., at 140° C., at least 19 atm., and at 170° C., at least 25 atm.

Ethylene oxide and sulfur dioxide, when brought together at lower temperature, form a compound of addition having the formula $C_2H_4O.SO_2$ with evolution of heat. Generally this compound will be formed at least in part when ethylene oxide and sulfur dioxide are mixed in liquid phase. It may be advantageous to proceed directly from this compound of addition, which also can be produced for example by the introduction of gaseous sulfur dioxide into cooled liquid ethylene oxide, and to expose the resulting liquid mixture to a temperature of 50–170° C.

The reaction may be carried out in a simple pressure vessel, for example a pressure tube, which permits the maintenance of the reaction temperatures of 50–170° C. The ethylene oxide and sulfur dioxide advantageously are mixed immediately before introduction into the reaction vessel, and in this way the heat of mixing can be utilized directly for heating the reaction mixture.

In contrast to the known processes, there is obtained according to the present process a practically complete conversion with excellent yields of glycol sulfite. This makes it unnecessary to recover ethylene oxide and sulfur dioxide from the reaction mixture. It is not necessary to use a catalyst. Owing to this and owing to operation in the liquid phase, the dimensions of the reaction apparatus can be reduced to a minimum.

*Example*

3.5 kg. of ethylene oxide and 5.1 kg. of sulfur dioxide per hour are introduced in liquid phase under a pressure of 25 atm. into a pipe coil heated to 140° C. said pipe having an inside diameter of 29 mm. and holding 13.5 liters. The ethylene oxide and sulfur dioxide come together just before entering the coil and the mixture has a temperature of 50 to 70° C. The hourly yield is 8.6 kg. of a reaction product which is practically free from unreacted ethylene oxide and sulfur dioxide and from which 7.9 kg. of pure glycol sulfite per hour are obtained by distillation. The conversion is practically complete; the yield is 92% of the theory.

We claim:

Process for the production of glycol sulfite which consists in heating a mixture consisting of ethylene oxide and sulfur dioxide in the liquid phase at a temperature within the range from 50 to 170° C. at a superatmospheric pressure within the range from at least 4 to 25 atmospheres which is sufficient to maintain said mixture in liquid phase and separating the glycol sulfite by distilling the reaction product.

References Cited in the file of this patent

UNITED STATES PATENTS 2,684,977    Viard _____ July 27, 1954

FOREIGN PATENTS 670,159    Great Britain _____ Apr. 16, 1952